March 12, 1935.  G. S. FROST  1,994,214
PACKAGE FOR FOOD PRODUCTS
Filed April 23, 1932
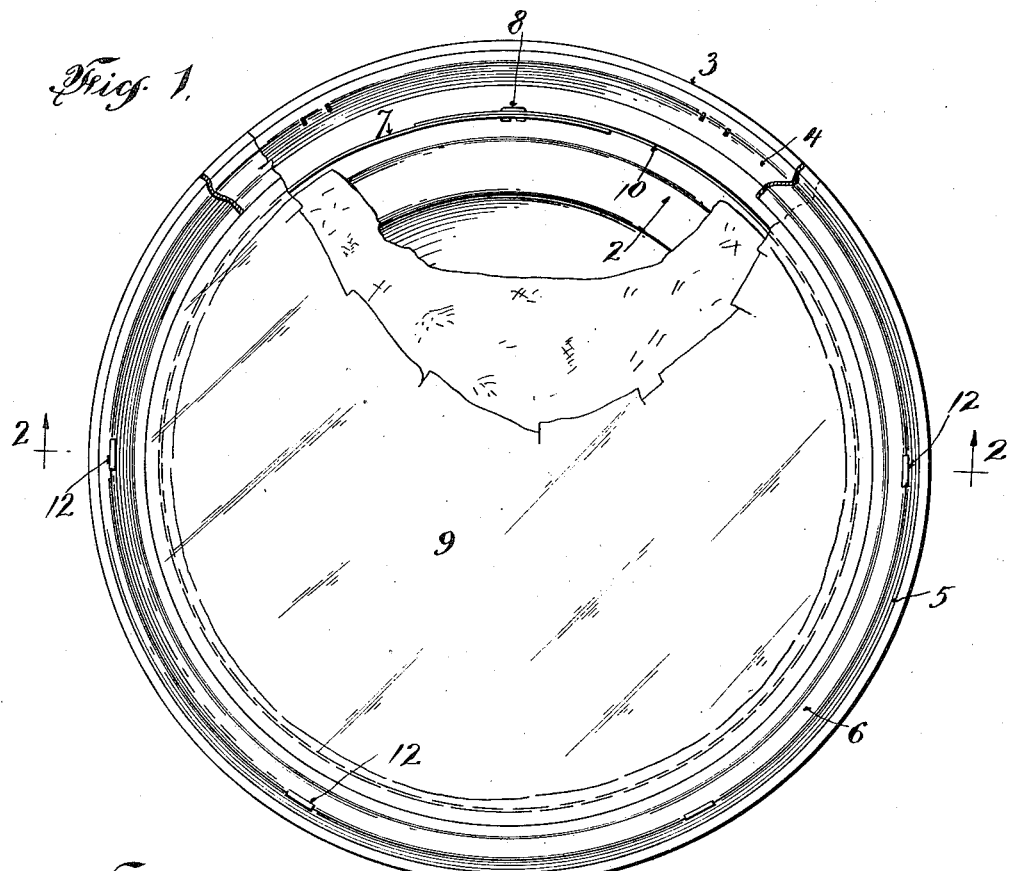
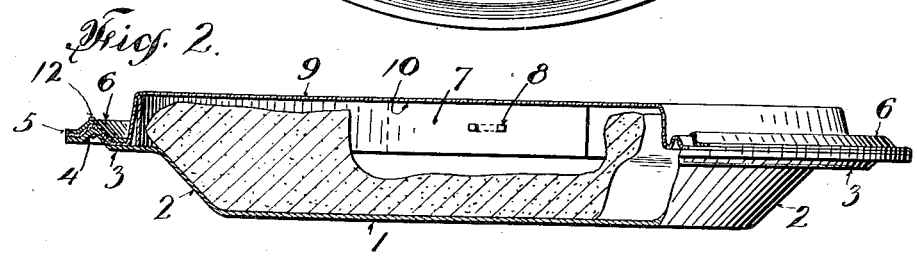
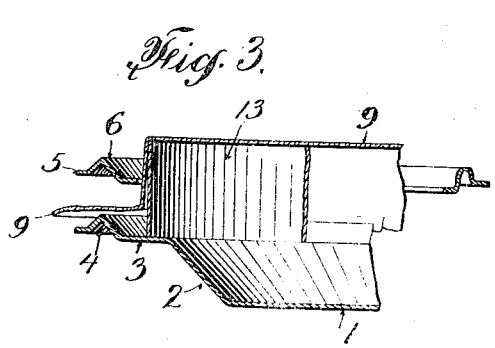
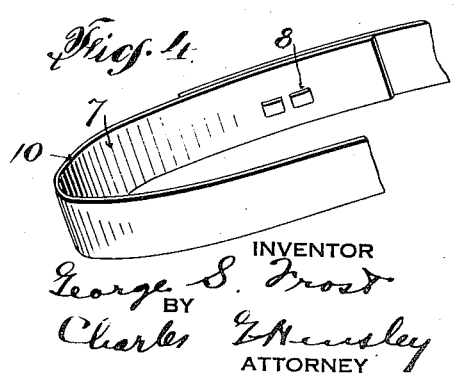
INVENTOR
George S. Frost
BY
Charles T. Hensley
ATTORNEY Patented Mar. 12, 1935

1,994,214

UNITED STATES PATENT OFFICE 1,994,214

PACKAGE FOR FOOD PRODUCTS

George S. Frost, Baldwin, N. Y.

Application April 23, 1932, Serial No. 607,061

6 Claims. (Cl. 206—44)

My invention relates to packages or put-ups and while the same is especially suitable for use as a package for both covered and uncovered pies, it is also adapted to be used for various food products, such as cakes. Heretofore, two general methods have been adopted for packages for individual pies. One was to secure together two paper or pulp plates facing in opposite directions, the pie being placed in the space between the opposed plates. One objection to this method of packing is that the pie is not visible to the purchaser unless holes are made in one of the plates, and when this is done only a small portion of the pie may be observed through the holes, and in addition the package is not sanitary because dirt may work through the holes to the pie.

Another method was to place individual pies in envelopes made of transparent material, such as glacine paper or cellophane. In this method the whole pie is visible through the container but as the envelope is very pliable there is no support or backing for the pie and the latter is often broken during handling.

The object of my present invention is to provide a package for individual pies and other food products, which will protect the pies or food product, from breakage even though roughly handled; which will entirely protect the pies or food products from being contaminated, because the pies or other food products are entirely enclosed and sealed in a sanitary manner.

Another object is to permit the entire top of the pie or other food product to be clearly seen from the exterior of the package so that purchasers may not only see what kind of pie is contained in each package, but may be able to judge its size, fullness and quality. These advantages are obtained with the present invention, and furthermore the present device is inexpensive and presents a pleasing and attractive package. The pies or other food products may be placed in the package and the latter may be sealed or closed without handling.

In my co-pending application Serial No. 554,931 filed August 3, 1931, I showed and described a package adapted for the same general purposes as the present invention. The present invention, however, is an improvement upon the package shown in said co-pending application in the following respects: In addition to the plate or dish I provide an upstanding collar surrounding the food product, and over the top edge of which the transparent material, such as glacine paper or cellophane is stretched so that the transparent material is supported by the collar referred to rather than by the food product.

There are other advantages in this arrangement in which the transparent material is supported by the collar instead of by the food product, in that if the food product is a type of pie called a "strap" or a fresh, exposed fruit pie, there is no pressure on the top of it and the transparent material is held out of contact with the fruit or soft material on the top of the food product. Furthermore, the transparent material is supported in a smooth plane by the collar, whereas if allowed to rest on the food product its shape is irregular. Therefore, the present package is neater in appearance.

With the present invention it is possible to stack one package upon another, or one package on several others, without injury to the food products contained in them, because the upper package will rest on the collar of the package below it rather than on the food product, so that the latter is not injured when several packages are stacked one upon another.

Another advantage is that the use of the collar renders the package more perfectly air-tight because the bottom of the collar presses against the plate or dish and the transparent material is drawn tightly and smoothly across the upper edge of the collar. Furthermore, air is more completely excluded from the present package because any air to enter the package must travel not only between the plate flange and the connecting ring, but also between the transparent material and the collar, and therefore, the package is more perfect in excluding air. For the same reasons dust or dirt is more perfectly excluded from the package.

One advantage of the present invention is that a stock type of plate or dish may be employed, i. e., a plate or dish having a fixed or uniform depth and the package as a whole may be made to conform with the depth of the food product by using collars of different depths. Thus, if shallow pies are to be enclosed, a relatively low type of collar may be used, and on the other hand, where a deep pie or other food product is to be enclosed, it is simply necessary to use a deeper collar to secure the same results without necessarily modifying the depth of the plate or dish. This is an advantage in putting up a variety of products as it avoids the necessity of having a multiplicity of plates or dishes.

Other advantages will be set forth in the following detailed description of my invention.

In the drawing forming part of this application,

Figure 1 is a face view of a package embodying my invention, the package being shown as enclosing a pie and parts being broken away to show the interior, Figure 2 is a sectional view taken on the line 2—2 of Figure 1, Figure 3 is a sectional view showing the parts in the process of being assembled and showing the use of a deeper collar, and Figure 4 is a perspective view of a portion of the collar.

As has been previously stated, the present package is adapted to enclose various food products such as pies, cakes and the like, and in the drawing I have chosen to illustrate the invention as employed for enclosing a pie. In the drawing I have shown a plate or dish which is the relatively stiff member of the package, and this may be made of cardboard, pressed pulp or any other material suitable for the purpose and it is intended that this member, as well as the remainder of the package, be made of inexpensive material to permit the package to be discarded after a single use.

The plate illustrated in the drawing includes a bottom wall 1, which is shown as flat; of a frustoconical wall 2 extending upwardly and outwardly from the bottom wall, together with a flange 3 projecting laterally at the top of the wall 2. The flange 3 is preferably, though not necessarily, horizontally disposed, and it serves not only as a means for attaching the remaining members of the package thereto, but also to stiffen the plate or dish as a whole. The flange 3 is shown as formed with a raised bead 4 extending around the same, so that the bead is of annular shape when viewed from the top of the package.

There is a ring member 5 which may be made of the same material as the plate or dish, or any other suitable material.

This comprises an annular member extending around the top of the flange 3 of the plate being preferably of the same exterior diameter as the flange; and this ring is also provided with a raised bead 6 which serves not only to stiffen the ring but also to nest in relation to the bead 4 of the flange 3, for the purpose of bending the transparent material and tightly locking it in the manner hereinafter described.

In addition to the plate or dish and the locking ring, I provide an upstanding collar which is preferably made separate from the plate or dish and adapted to rest preferably on the flange 3. In the drawing I have shown this member in the form of a band 7 of annular shape with the ends connected to each other by means of the staple 8 or in any other suitable way. This collar may be made of a strip of cardboard or other material of sufficient stiffness to retain its shape during handling of the package. The collar is intended to encircle the pie or other food product and when it rests on the flange 3 the upper edge of the collar is adapted to lie flush with or slightly above the top surface of the food product, as shown in Figure 2.

I provide a sheet of transparent material such as glacine paper, cellophane or other material of a transparent nature which is shown in the drawing as a sheet 9 which extends across the open top of the collar and resting on the top edge 10 thereof. This sheet is of sufficient size to extend downwardly on the outer side of the collar and thence laterally between the top surface of the flange 3 and the under surface of the ring 6.

In assembling the package the food product may be first inserted into the tray or dish so that it rests against the bottom wall 1 and the wall 2.

The collar may then be placed around the food product so that its bottom edge rests on the flange 3, the collar lying within the annular bead 4. The transparent sheet is then placed across the top of the ring so that it extends entirely over the food product, with the outer portion of the sheet extending over the flange 3. The ring 5 is then placed against the outer portion of the transparent sheet and it is pressed against the flange 3 so that the bead 6 of the ring nests upon the bead 4 of the plate flange engaging the outer portion of the transparent sheet between them. Staples 12 are then stitched through the flange and ring, preferably through the beads 4 and 6, to secure the ring to the plate flange with the outer portion of the transparent sheet clamped between them. Any number of staples may be stitched in this manner around the circumference of the plate, and I have found that in a twelve-inch package six staples are ample to secure the parts together.

It will be observed that the transparent sheet is drawn across the top edge 10 of the collar, so that it lies just above the top of the food product, and preferably out of contact therewith. The sheet 9, therefore, presents a smooth appearance where it extends across the food product, and if the latter has a soft top or is partly or entirely uncovered, such as an open fruit or meringue pie, the sheet 9 does not rest on the soft top. All of the advantages referred to above may be obtained by the use of the collar in conjunction with the other features of my invention. If one package is stacked upon another the upper package will rest down upon the collar rather than having the weight come upon the food product below the flexible sheet 9, so that when the packages are stacked the food product is not injured even though the latter has a soft top.

If only one size of tray or dish is employed for food products of different depths, a collar may be selected of suitable depth to conform to the spacing of the food product above the flange 3 of the plate or dish so that a plate or dish of one depth may be utilized for enclosing food products of different relative depths merely by selecting collars of different proportions.

In Figure 3 I have shown a collar 13 which is deeper than the collar in Figure 2, to accommodate a relatively deeper product with the same kind of plate or dish. It is therefore not necessary to have a wide variety of plates or dishes as might be necessary if the collar 7 were not used. It is not necessary that the wall 2 be inclined but it is preferably so where the package is used to enclose pies.

Having described my invention, what I claim is:

1. A package for food products, including a relatively stiff plate or dish for holding the food product therein with the food product extending above the top edge of the plate, and having a flange at its upper edge extending outwardly therefrom, a collar surrounding the food product, said collar resting on the flange of said plate or dish and extending upwardly therefrom and above the top edge of the plate, a sheet of pliable, transparent material extending across the food product, over the upper edge of said collar and over said flange, and means for securing said sheet outside the collar to the flange of said plate or dish.

2. A package for food products, including a plate or dish for holding a food product therein, said plate or dish having a laterally extending flange at its upper portion, said flange being provided with an annular bead, a collar surrounding the food product, resting on said flange and extending over the food product and across the top edge of said collar and extending thence across the flange, and an annular ring having a bead adapted to nest on the bead of said flange and to clamp the outer portion of said sheet between said ring and flange, and means for securing said ring to said flange.

3. A package for food products including a plate or dish for holding a food product therein, said plate or dish being composed of pulp stock and having a laterally extending flange at its upper portion provided with an annular bead, a collar composed of pulp or paper stock and consisting of a band having its ends connected to form an annular ring, said collar surrounding the food product and resting on the flange of said plate or dish, a sheet of transparent material extending across the food product and resting on the upper edge of said collar and extending thence outwardly over the top of said plate flange, an annular ring having a bead nesting with the bead of said plate flange, and means for securing said ring to said plate flange to clamp the outer portion of said transparent sheet.

4. A package for food products, including a relatively stiff plate or dish for holding the food product therein, with the food product extending above the rim of the plate, a collar surrounding the food product and extending upwardly from the plate or dish so that its top edge projects above the plane of the top edge of the plate, a sheet of pliable, transparent material extending across the food product and over the upper edge of said collar, and means for securing said sheet outside the collar to said plate.

5. A package for food products, including a relatively stiff plate or dish for holding a food product therein with the food product extending above the top edge of the plate and having a flange at its upper edge extending outwardly therefrom, a separate collar surrounding the food product and resting on said plate or dish and extending upwardly therefrom so that its upper edge will lie flush with or above the top of the food product, a sheet of pliable, transparent material extending over the food product across the top edge of said collar and over said flange, and an annular ring clamped face to face against the flange of the plate with the outer edge of said pliable sheet clamped between said ring and said flange, and means for securing the annular ring and the flange together.

6. A package for food products, including a relatively stiff plate or dish for holding the food product therein with the food product extending above the top edge of the plate, said plate having a bottom wall, an inclined, annular wall extending upwardly from the bottom wall and a laterally extending flange at the top of said inclined wall, a collar surrounding the food product and resting on said flange, a sheet of pliable, transparent material extending over the food product across the top of said collar and over said flange, and an annular ring arranged face to face against said latter flange of the plate with the pliable material clamped between said ring and said flange, and means for securing said annular ring to the flange of the plate.

GEORGE S. FROST.